United States Patent
Leingang (10) Patent No.: US 6,347,588 B1
(45) Date of Patent: Feb. 19, 2002

(54) LATERAL CONTROL MOUNT

(75) Inventor: Charles J. Leingang, Erie, PA (US)

(73) Assignee: Lord Corporation, Cary, NC (US)

(*) Notice: Subject to any disclaimer, the term of this patent is extended or adjusted under 35 U.S.C. 154(b) by 0 days.

(21) Appl. No.: 09/660,630

(22) Filed: Sep. 13, 2000

Related U.S. Application Data (62) Division of application No. 09/479,345, filed on Jan. 7, 2000.

(51) Int. Cl.$^7$ ................................................ B61F 5/14
(52) U.S. Cl. ......................... 105/224.1; 105/218.1; 105/220; 105/225
(58) Field of Search ............................ 105/218.1, 220, 105/225, 224.1; 267/3, 141.1, 294, 63; 384/24, 37, 36

(56) References Cited

U.S. PATENT DOCUMENTS

| | | | | |
|---|---|---|---|---|
| 2,009,059 A | * | 7/1935 | Brennan et al. | 267/63 |
| 3,047,163 A | | 7/1962 | Johnson et al. | 213/40 |
| 3,098,682 A | | 7/1963 | Thomas | 308/54 |
| 3,222,111 A | | 12/1965 | Thomas | 308/54 |
| 3,274,955 A | | 9/1966 | Thomas | 105/224.1 |
| 3,276,395 A | | 10/1966 | Heintzel | 105/224.1 |
| 3,575,403 A | * | 4/1971 | Hamel | 267/63 |
| 3,699,897 A | | 10/1972 | Sherrick | 105/218 R |
| 4,111,131 A | | 9/1978 | Bullock | 105/224.1 |
| 4,258,629 A | | 3/1981 | Jackson et al. | 105/167 |
| 4,589,347 A | * | 5/1986 | Colford et al. | 105/224.1 |
| 5,237,933 A | * | 8/1993 | Bucksbee | 105/224.1 |

FOREIGN PATENT DOCUMENTS

| | | |
|---|---|---|
| BE | 552 456 A | 11/1956 |
| EP | 0 086 578 A2 | 8/1983 |

OTHER PUBLICATIONS

Lord Kinematics, *Elastometric LC—Pads*, Bulletin No. D–748, 1978.
Lord Product Data on Vibration/Shock/Noise Control, *Elastometric Journal Bearing Wedge*, Bulletin D–2701, Sep. 1964.

* cited by examiner

Primary Examiner—S. Joseph Morano
Assistant Examiner—Frantz F. Jules
(74) Attorney, Agent, or Firm—Michael M. Gnibus (57) ABSTRACT

A mount for use in the suspension system of a railway that truck limits the relative lateral movement between a side frame member and a bearing adapter. In one embodiment, the mount includes a rigid material layer having at least four sections laterally angled between a horizontal axis and a vertical axis. A first and second elastic material layer are respectively positioned between the side frame member and rigid material layer, and between the rigid material layers and bearing adapter. The first elastic material layer has least four sections abutting and conforming to at least four sections of the rigid material layer. In addition, the second elastic material layer has at least four sections abutting and conforming to at least four sections of the rigid material layer. The angled sections cooperate to increase the lateral spring rate of the mount, and improve the ride characteristics and high speed stability of the railway truck.

19 Claims, 6 Drawing Sheets

LATERAL CONTROL MOUNT

This is a divisional application of U.S. application Ser. No. 09/479,345 filed Jan. 7, 2000.

BACKGROUND OF THE INVENTION

This invention relates generally to suspension mountings, and more particularly, to mountings for the steering system of a railway truck.

Mountings with load suspension and vibration-dampening capabilities have been used in the past to improve the steering and ride characteristics of railway trucks. A typical railway truck includes two side frames connecting front and rear wheelsets mounted on axles. The side frames are connected by a cross-member or bolster and provide the railway truck with a stiff structure for mounting a railway car for carrying cargo. An elastomeric mounting, which is a mounting that includes a pad of an elastic material like rubber or another elastomeric material, is typically positioned between an axle bearing adapter and the side frame adjacent to each wheel to support the frame and car on the axle. The elastomeric mountings permit the axles of the railway car to move horizontally with respect to the side frames to allow the axles to turn or follow the rail curvature. Additionally, the elastomeric mountings support vertical static and dynamic loads, such as the weight of the frame and cargo in the car. This type of suspension is typically utilized in, for example, radial self-steering and non-radial railway trucks. By allowing the axles to turn with respect to the railway truck, the elastomeric mountings reduce the friction between the wheels and the rail, thereby improving their life. Additionally, the reduced friction makes the railway truck easier to pull, thereby increasing fuel economy for the train locomotive.

The railway truck may experience ride control problems when using typical elastomeric mountings, however, due to the mountings' lack of control over lateral horizontal motion independent of longitudinal horizontal motion. For example, lateral motion of the axles with respect, to the side frames can contribute to instability of the railway truck at high speeds, which produces poor ride characteristics. Since the elastomeric pad of a typical elastomeric mounting is generally flat in the horizontal plane, the lateral spring rate typically is about equal to the longitudinal spring rate. As such, it is generally not desirable to increase the lateral spring rate of the flat elastomeric pad, because this will result in the longitudinal spring rate being correspondingly increased, negatively affecting the steering characteristics of the railway truck.

In order to increase the lateral spring rate independent of the longitudinal spring rate, some elastomeric mountings have included alternating layers of elastomeric pads and rigid shims having a V-shaped, or inverted V-shaped, cross-section. The V-shaped cross-section is in a plane parallel to the axles, or perpendicular to the side frames. For instance, one such elastomeric mounting is described in U.S. Pat. No. 3,699,897 to Sherrick, issued Oct. 24, 1972 and assigned to the assignee of the present invention. The V-shaped cross-section provides a laterally-inclined surface that increases the lateral spring rate of the mount, but does not affect the longitudinal spring rate. Also, the V-shape of the rigid shim, for example, serves to contain the lateral movement of the elastomeric pad, reducing the amount of pure shear and increasing lateral compression within the elastomeric pad, thereby increasing the lateral spring rate. Similar mounts have used other curved cross-sectional shapes, as well as flanges, to restrain the lateral motion of the mount.

These solutions have had limited success in increasing the lateral spring rate, however, because the angle of the inclined V-shaped cross-section is limited by the allowed space for the mount. In many cases, elastomeric mountings are required to adapt to, improve or be retrofit into existing railway trucks. As a result, the available space for the mount may be limited to the space occupied by the existing mount. This available space generally cannot be increased, for example, due to railway truck height limitations for going under bridges and through tunnels, and due to coupler height limitations to permit adjacent railway trucks to be coupled together. In many cases, this available space does not allow a sufficiently inclined V-shaped section to provide a desired lateral spring rate. Thus, since the spring rate of the elastomeric pad cannot be increased without unwelcome changes to the longitudinal spring rate, a less than optimal solution is provided by mountings having V-shaped or other curved-shaped cross-sections.

SUMMARY OF THE INVENTION

In order to overcome the drawbacks of the prior art, a mount for use between a side frame member and a bearing adapter in the suspension system of a railway truck has been developed that has a dramatically-increased lateral spring rate. In one embodiment, a mount includes a rigid material layer having at least four sections laterally angled between a horizontal axis and a vertical axis, and at least two of the at least four sections being oriented parallel to a different axis than the other two. A first and second elastic material layer are positioned, respectively, between the side frame member and rigid material layer and the rigid material layer and bearing adapter. Also, the first and second elastic material layers each have at least four sections abutting and conforming to the at least four sections of the rigid material layer. Each of the first and second elastic material layers, as well as the rigid material layer, have a thickness and angular orientation selected to result in the lateral horizontal spring rate having a compression component and a shear component, and wherein the compression component is greater than the shear component. Thus, the angled sections cooperate to dramatically increase the horizontal lateral spring rate of the mount without increasing the horizontal longitudinal spring rate, thereby improving the ride characteristics and high speed stability of the railway truck.

The mount may further include a top plate and bottom plate respectively in contact with the first and second elastic material layers for adapting the mount to the side frame member and bearing adapter, respectively. Preferably, the top plate has a bottom surface with at least four sections that correspond with and are parallel to the at least four sections of the rigid material layer. Similarly, the bottom plate preferably has a top surface with at least four sections that correspond with and are parallel to the at least four sections of the rigid material layer. The mount therefore includes internal sections preferably laterally-angled in opposite directions from one section to the next to form a W-shape, or an inverted W-shape, in cross-section. These angled internal surfaces of the top and bottom plate cooperate with the angled sections of the first and second elastic material layers and the rigid material layer to result in a lateral horizontal spring rate greater than a longitudinal horizontal spring rate.

In addition, the first and second elastic material layers may include cut-out portions defining horizontal longitudinally-extending chambers and, separately or in combination, vertically-extending chambers. These chambers formed in the cut-out portions improve the ability to fine tune the spring rates of the mount. Further, these chambers improve the fatigue life of the elastic material in the mount by increasing the bulge area. For purposes of this disclosure, the "bulge area" is defined as the vertical area in which the first elastic layer and the second elastic layer are free to horizontally expand. The chambers provide the mount with a bulge area greater than the combined perimeter vertical area of the first and second layers, defined as the vertical thickness of each layer multiplied by the perimeter length of each layer.

DETAILED DESCRIPTION OF THE INVENTION

Figure 1:
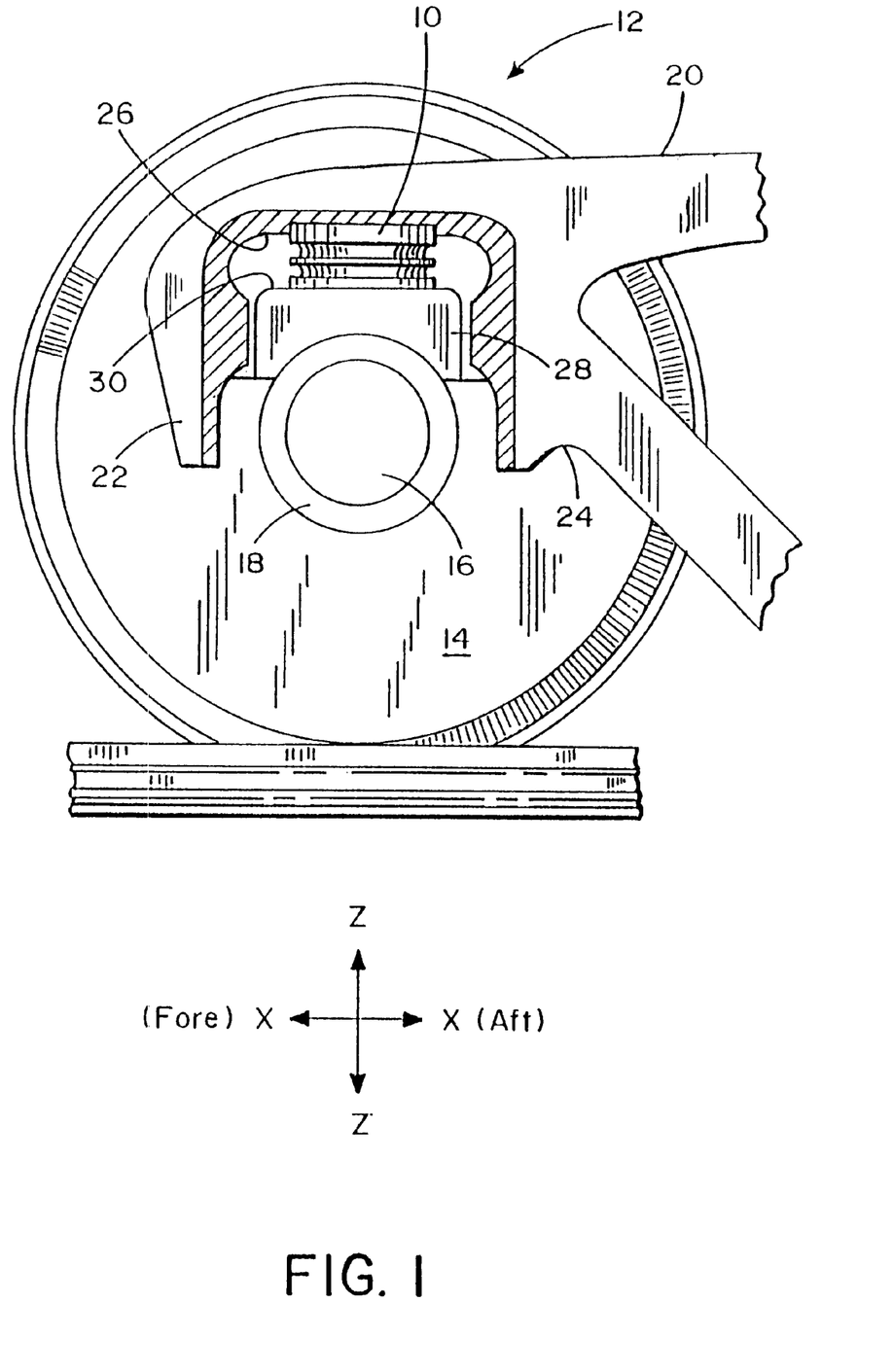
FIG. 1 is a fragmentary side elevational view of one quadrant of a railway truck, where the other quadrants are symmetrical, incorporating a lateral control mount.

According to one preferred embodiment, referring to FIG. 1, a mount 10 utilized in a suspension system of one quadrant of a railway truck 12 advantageously is configured to provide an increased lateral spring rate without increasing a longitudinal spring rate, thereby improving the steering and ride characteristics of the railway truck. The railway truck 12 includes wheels 14 mounted at the ends of laterally-extending front and rear axles 16. Only one quadrant of the railway truck 12 is illustrated in FIG. 1, showing one wheel and one axle, as the other quadrants are symmetrical. Each axle 16 is rotatably mounted at each end within an anti-friction bearing 18, such as a roller bearing. Side frame members 20 longitudinally extend to connect the front and rear axles 16 at the respective ends of each axle. The side frame members 20 have downwardly depending pedestal jaws 22 and 24 spaced fore and aft of the bearing 18. The pedestal jaws 22 and 24 define a load-carrying surface 26 therebetween which is positioned directly above the bearing 18. A bearing adapter 28 is received in overlying relation to and carried by the bearing 18. A load-receiving surface 30 of the adapter 28 is spaced directly beneath and presented toward the load-carrying surface 26 of the side frame 20.

Figure 2:
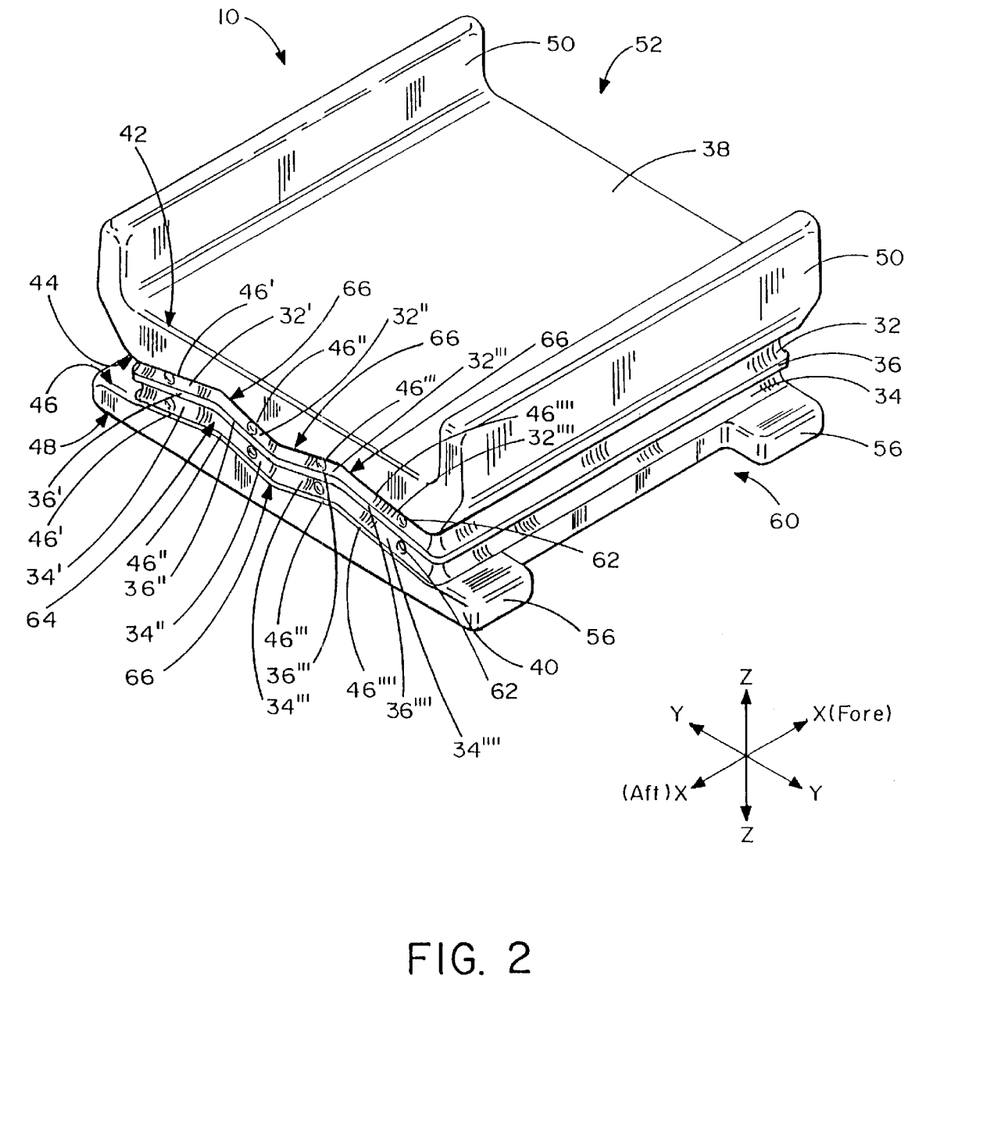
FIG. 2 is a rear perspective view of one embodiment of the lateral control mount.

The mount 10 is positioned and interlocked between the load-carrying surface 26 of the side frame 20 and the load-receiving surface 30 of the adapter 28. Referring to FIGS. 2–5, the mount 10 includes a body of elastic material preferably including first and second elastic material layers 32 and 34 that accommodate horizontal movement of the axles 16 relative to the side frames 20, while supporting vertical static and dynamic loads. Additionally, the mount 10 includes a rigid material layer, plate or shim 36, positioned between and abutting the first and second material layers 32 and 34, for increasing the compression load-carrying ability of the mount. Further, the rigid material layer 36 includes at least four sections 36', 36", 36''', 36'''', each laterally angled between a horizontal axis Y-Y and the vertical axis Z-Z (FIG. 2). Preferably, the sections 36', 36", 36''', 36'''' are portions of the rigid material layer 36 that lie in a longitudinally flat plane, where each planar section is angled between the horizontal plane X-Y and the vertical plane X-Z such that a longitudinal line through any of the sections is parallel to the X-X axis (FIG. 2). The lateral angular orientation of the sections 36', 36", 36''', 36'''' preferably reverses from one section to the next, thereby forming an inverted W-shaped cross-section in the Y-Z plane (similar to an M-shape with sloping sides, as in FIG. 2), which is parallel to the axle 16 and perpendicular to the side frame 20. In operation, the inverted W-shaped cross-section is arranged with the adapter bearing 28 being positioned below the downwardly-directed outer ends of the inverted form. A non-inverted orientation of the W-shaped cross-section may also be used in operation. As compared to prior art rigid material layers having V- or inverted V-shaped cross-sections, the orientation and geometry of the sections 36', 36", 36''', 36'''' of the rigid layer 36 unexpectedly provide a horizontal lateral spring rate of a substantially greater magnitude in a given space. Therefore, the mount 10 maintains a horizontal longitudinal (fore and aft) spring rate (Kx) and a vertical spring rate (Kz) within standard ranges while providing a dramatic increase in a horizontal lateral spring rate (Ky) to improve ride and handling characteristics of the railway truck 12.

The mount 10 is connectable to the side frame 20 and adapter 28, respectively, through a top plate 38 and a bottom plate 40, respectively. The top plate 38 has a top surface 42 for receiving loads from the load-carrying surface 26 of the side frame 20. The top plate 38 also includes a bottom surface 44 for transferring loads to the first elastic material layer 32. The bottom surface 44 includes at least four sections 44', 44", 44''', 44'''' laterally angled between the horizontal axis Y-Y and the vertical axis Z-Z. Preferably, the sections 44', 44", 44''', 44'''' are longitudinally flat, being angled between the horizontal plane X-Y and the vertical plane X-Z such that a longitudinal line through any of the sections is parallel to the X—X axis. The sections 44', 44", 44''', 44'''' correspond with, and are parallel to, the sections 36', 36", 36''', 36'''' of the rigid material layer 36. Similarly, the bottom plate 40 has a top surface 46 with at least four sections 46', 46", 46''', 46'''' laterally angled between the horizontal axis Y-Y and the vertical axis Z-Z. The sections 46', 46", 46''', 46'''' correspond with, and are parallel to, the sections 36', 36", 36''', 36'''' of the rigid material layer 36. The top surface 46 of the bottom plate 40 receives loads transferred through the second elastic material layer 34 and transfers them through a bottom surface 48 to the load-receiving surface 30 of the adapter 28. The top surface 42 of the top plate 38 and the bottom surface 48 of bottom plate 40 preferably lie in a plane parallel to the horizontal plane X-Y. These surfaces 42 and 48 may have other forms to correspond to the mating surface of the respective side frame and adapter, however, such a convex form, a concave form or other angled forms.

Although not required, the top plate 38 preferably includes vertically-projecting longitudinal flanges 50 at the lateral edges of the top surface 42. The flanges 50 are sized and positioned to form a channel 52 for receiving the side frame 20 and positioning the load carrying surface 26 against the top surface 42 of the top plate 38 to prevent lateral movement of the side frame relative to the top plate. Similarly, although not required, the bottom plate 40 preferably includes laterally-projecting flanges 56 positioned, for example, at the corners of the bottom plate. Also, the flanges 56 may be sized and positioned to form a channel 60 for positioning the mount 10 relative to the adapter 28 to prevent longitudinal (fore and aft) movement of the adapter relative to the mount. Additionally, the flanges 56 of the bottom plate 40 may project downwardly (not shown), in the opposite direction of the extending flanges 50 of the top plate 38, to form a channel similar to channel 52 in order to fit different roller bearing adapters. Therefore, the top and bottom plates 38 and 40 aid in securing the mount 10 to the side frame 20 and adapter 28.

In operation, the mount 10 acts as a suspension system, carrying the load and isolating vibration, between the side frame 20, and the axle 16. The plurality of laterally-angled sections of top plate bottom surface 44, first elastic layer 32, rigid layer 36, second elastic layer 34 and bottom plate top surface 46 cooperate to provide the mount 10 with a relatively low vertical spring rate (Kz) and an increased lateral spring rate (Ky), without a corresponding increase in the longitudinal spring rate (Kx). This is accomplished by internally providing the mount 10 with relatively short, lateral sections laterally-angled ($\alpha$ and $\beta$)(FIG. 5) such that during lateral horizontal motion between the side frame 20 and adapter 28, the pure shear within the respective elastic layers 32 and 34 is reduced while the compression within the elastic layers is increased. This results in a higher lateral spring rate (Ky). At the same time, the pure shear from longitudinal motions is substantially the same as in existing mounts with horizontally flat elastic layers, while the compression from vertical motion is also substantially unchanged.

As opposed to simple V-shaped cross-sectioned designs that span the entire lateral width of a mount, the relatively short, lateral sections of the mount 10 can have a relatively steep lateral angle ($\alpha$ and $\beta$) within a given space. Whereas the angle of a simple V-shaped cross section would be limited by the length of each leg of the "V", thereby limiting the ability to increase the lateral spring rate, the multi-sectioned, angled rigid and elastic layers of the mount 10 can be positioned at greater lateral angles in a given space. Further, the multiple short, lateral sections of the mount 10 beneficially make the mount more symmetrical with respect to load distribution. Also, adjacent laterally angled sections 44', 44", 44''', 44'''', 32', 32", 32''', 32'''', 34', 34", 34''', 34'''', 36', 36", 36''', 36'''' and 46', 46", 46''', 46'''' within a given surface or layer preferably have substantially equivalent angles $\alpha$ and $\beta$, where each section is angled in the opposite direction to provide the same lateral spring rate in both lateral directions. As a result, the mount 10 preferably includes symmetrically balanced opposing pairs of angled sections. The mount 10 need not be laterally symmetrical and the lateral angles $\alpha$ and $\beta$ could be different, however, depending on the allowed space, the specifics of the installation, and if a directional mount is desired that provides differing lateral spring rates in each lateral direction. Although the various sections are shown as being substantially equivalent in lateral length, the mount 10 may include combinations of sections having substantially equivalent or differing lateral lengths, combined with combinations lateral angles for each section.

Typically, for each application in which the mount 10 may be utilized, there are desired spring rate ratios under given vertical loads. For example, an application may require the ratio of the vertical spring rate (Kz) to the lateral spring rate (Ky), defined as an "L-value" for purposes of this disclosure, or L=$K_{vertical}/K_{lateral}$=Kz/Ky, to be within a desired range. With the mount 10, it is possible to have a relatively low vertical spring rate (Kz) while having an increased lateral spring rate (Ky). The low vertical spring rate Kz improves the vertical isolation characteristic of the mount 10, while the higher lateral spring rate Ky improves the handling characteristics. For example, the mount 10 can achieve a vertical spring rate Kz that is 30% to 40% lower than in other shimmed and non-shimmed mounts of standard design. This is because in standard designs, which have horizontally flat rigid and elastic layers, the vertical spring rate Kz is primarily a function of the compression of the elastic layer, while the angled sections of the mount 10 produce shear and reduced compression in the elastic layer. Further, the mount 10 can achieve this vertical spring rate Kz in a shorter mount height and width than in V-shaped cross-sectional designs, thereby reducing the overall package size of the mount. The L-value can be designed to be any value within a wide range depending on the specifics of a particular application, such as the lateral angle of the sections, the planar area of the sections, the thickness of each of the elastic material layers and the overall package size. In one non-limiting example, the mount 10 provides L-values preferably in the range of about 15 to about 18, however, L-values in the range of about 10 to about 25 or more may be achieved where more variation in the overall package size is allowed.

Another spring rate ratio that may be required to be within a certain range is the ratio of the horizontal lateral spring rate Ky to the horizontal longitudinal spring rate Kx. It is desirable to maintain a low longitudinal spring rate Kx so as not to adversely change the steering capability of the truck 12, while increasing the lateral spring rate Ky improves high speed stability. The desired ratio depends on the performance of a particular truck in a specific application. Compared to standard mounts having substantially equivalent Ky and Kx, the mount 10 has the ability to provide a wide range of spring rate ratios for a given application due to the allowable variation in the slope or angles ($\alpha$ and $\beta$) of the internal angled surfaces. Again, the mount 10 can achieve these wide range of ratios in a shorter mount height and width than in V-shaped cross-sectional designs. Further, similar to the L-value, the Ky to Kx ratio can be designed to be within a very wide range, depending on the specifics of the application, such as the lateral angle of the sections, the planar area of the sections, the thickness of each of the elastic material layers and the overall package size. In one non-limiting example the mount 10 preferably provides a ratio of Ky to Kx in the range of about 1.6 to about 1.7, however, ratios in the range of about 1.3 to about 5.0 may be achieved.

Additionally, the first and second elastic layers 32 and 34 preferably include a number of cut-out portions that define a horizontal, longitudinally-extending chamber or core 62. The size, shape and position of each chamber or core 62 may vary, and is selected to help to fine tune the spring rates of the mount 10 while also beneficially improving the fatigue life of the elastic material by minimizing compression-induced shear strain. The chambers or cores 62 beneficially improve the fatigue life of the mount 10 by increasing the "bulge area" (Ba), defined as the area at which the elastic material layers 32 and 34 are allowed to horizontally expand. The chambers or cores 62 have a size and position that affect the value of both the vertical spring rate Kz and the lateral spring rate Ky. In one preferred embodiment, for example, in order to obtain a desired "L" value ratio of Kz/Ky, the size or in this case the diameter of the chambers or cores 62 is approximately equal to the distance between the top plate 38 and the rigid layer 36, which is also approximately equivalent to the distance between the rigid layer and the bottom plate 40. For practical reasons, however, there is shown a thin film of elastic material between the edge of the cores 62 and the adjacent surfaces as the cores are preferably formed with removable longitudinal rods or fingers inserted between the rigid material layer and the top and bottom plates during the molding process. Further, for example, the preferred position of the chambers or cores 62, from the lowest point or valley on the laterally angled section of the first and second elastic material layers 32 and 34, is approximately ⅓ of the distance from the lowest point to the highest point or peak of the section. Other size and position values may be used, depending on the magnitude of the "L value sought. The size of the chamber or core 62 also affects how freely the elastic material in layers 32 and 34 can bulge. Larger sizes of the chamber or core 62 allow the elastic material in layers 32 and 34 to bulge with less restriction than smaller sized chambers or cores. By having a void or space in which to bulge, the elastic material in the layers 32 and 34 is allowed to redistribute itself into the core or chamber 62, which minimizes the bulge on the outer surface of the layers. In so doing, the chamber or core 62 reduces the stress and strain on the outer surface of the layers 32 and 34 and further improves fatigue life.

Although a chamber or core 62 having a circular shape is preferred, the chamber my be square, rectangular, elliptical or any other shape that increases the bulge area and affects the spring rates of the mount 10. Also, the chamber 62 may be formed to only extend through portions of the elastic layers 32 and 34, and they may extend not only longitudinally, but in any direction. Therefore, the chamber 62 may be positioned anywhere within the elastic layers 32 and 34, their position, shape, size and number depending on the particular application and spring rate ratios sought.

Further, the first and second elastic material layers 32 and 34 preferably include an edge contour 64 to further improve the fatigue life of the elastic material. These contours 64 help to reduce stress concentrations or pinching. The contour 64 can be placed along any edge of the elastic material layers 32 and 34, including the outer surface of the layers 32 and 34 and the edges of the chambers or cores 62. Preferably, the contour 64 has a concave circular or elliptical shape, although other rounded shapes may be utilized.

Also, to further improve fatigue life and reduce stress concentrations, a transition area 66 that connects adjacent sections 44', 44'', 44''', 44'''', 32', 32'', 32''', 32'''', 36', 36'', 36''', 36'''', 34', 34'', 34''', 34'''' and 46', 46'', 46''', 46'''' preferably has a smooth, arcuate contour. The transition area 66 is formed, for example, at the peak/apex or valley between adjoining sections. It is possible to form the layers 32, 34 and 36 and plates 38 and 40 from separate, non-contiguous sections, however, which would not require these layers to have the transition area 66.

The first and second elastic material layers 32 and 34 may be formed from natural rubber, thermoplastic elastomer, synthetic elastomer, oil resistant elastomers or blends thereof. The actual elastic material used will depend on the application environment, although natural rubber is preferred for the mount 10. The material of the layers 32 and 34 preferably has a shear modulus in the range of about 150 to about 245 psi, but can be lower or higher depending on actual mount size, desired spring rates, and application loads, etc. Having the shear modulus lower or higher sacrifices other properties such as optimum fatigue life, while a higher shear modulus increases set and drift. Several suitable processes can be used to manufacture the mounting 10. Typical processes may include transfer molding, compression molding or injection molding. The elastomer can be bonded to the metal components using post vulcanization bonding or chemical bonding during the molding/vulcanization process. Alternatively, the elastic material may not necessarily need to be bonded, and could be mechanically fastened via any suitable device, such as tabs or molded retention buttons extending through corresponding receiving holes in adjacent structure. The preferred process is chemical bonding, however, because it permits the most efficient use of the elastic material for the best load capacity and overall performance.

The rigid material layer 36 may be formed from a substantially incompressible material having non-brittle characteristics, such as medium to high carbon cold rolled steel, stainless steel, iron, titanium, aluminum, engineered plastic, composites and other similar materials. The rigid material layer 36 preferably has a yield strength in the range of about 70,000 psi to about 90,000 psi, but can be lower or higher depending on actual mount size and application loads, etc.. The rigid material layer 36 may be positioned within a mold for the above-mentioned elastic material transfer processes, or the rigid material layer may be otherwise assembled within the mount 10. Additionally, the sections 36', 36'', 36''', 36'''' of the rigid material layer 36 may be formed, for example, during extrusion, casting or other known processes or the sections may be formed by stamping, forming or otherwise bending a flat rigid material layer.

The top and bottom plates 38 and 40 may be formed from a material that is substantially incompressible and non-brittle. Suitable materials for top and bottom plates 38 and 40 include low carbon steel, cast steel, cast iron, composites and other similar materials. The top and bottom plates 38 and 40 may be formed, for example, by casting, machining or molding.

Further embodiments of the mount are described below, wherein like reference characters are used, where possible, to indicate like parts.

Figure 3:
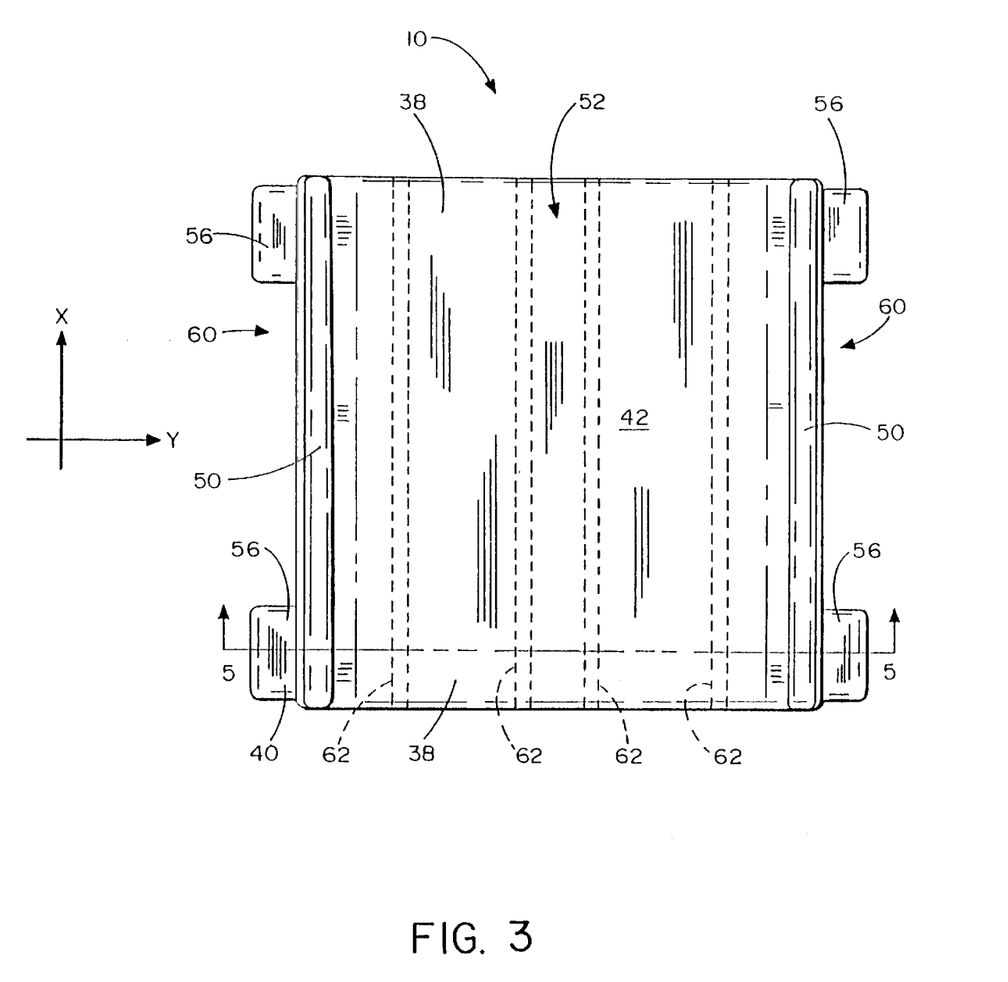
FIG. 3 is a top plan view of the mount of FIG. 2, with the dashed lines indicating hidden longitudinal chambers.
Figure 4:
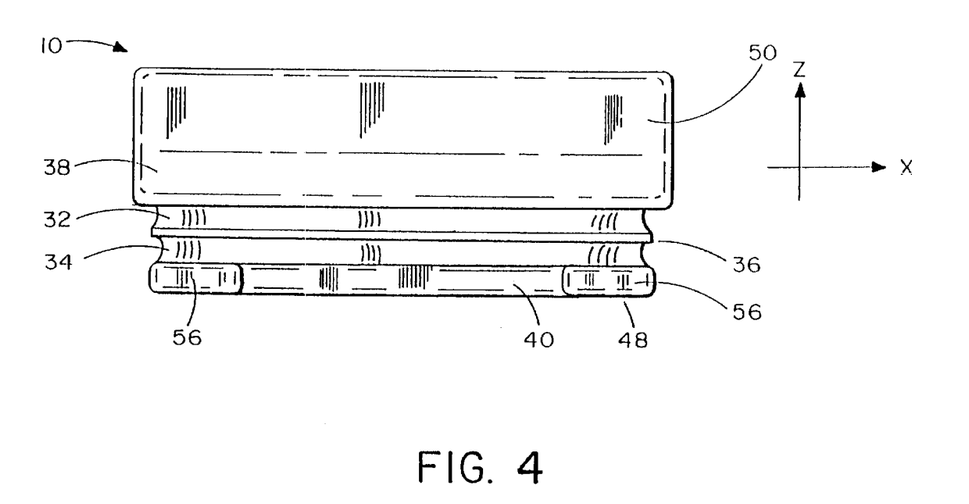
FIG. 4 is a side elevational view of the mount of FIG. 2.
Figure 5:
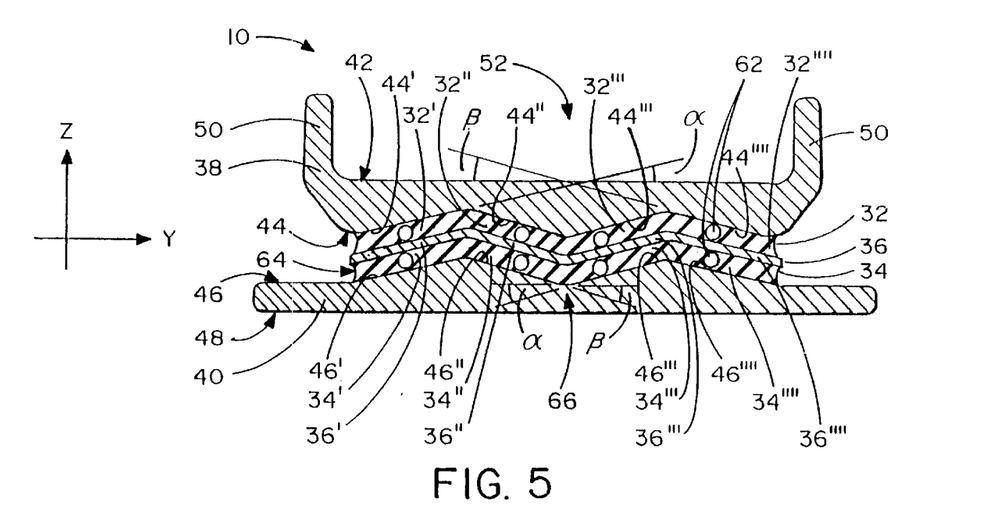
FIG. 5 is a cross-sectional view of the mount taken along line 5—5 of FIG. 3.
Figure 6:
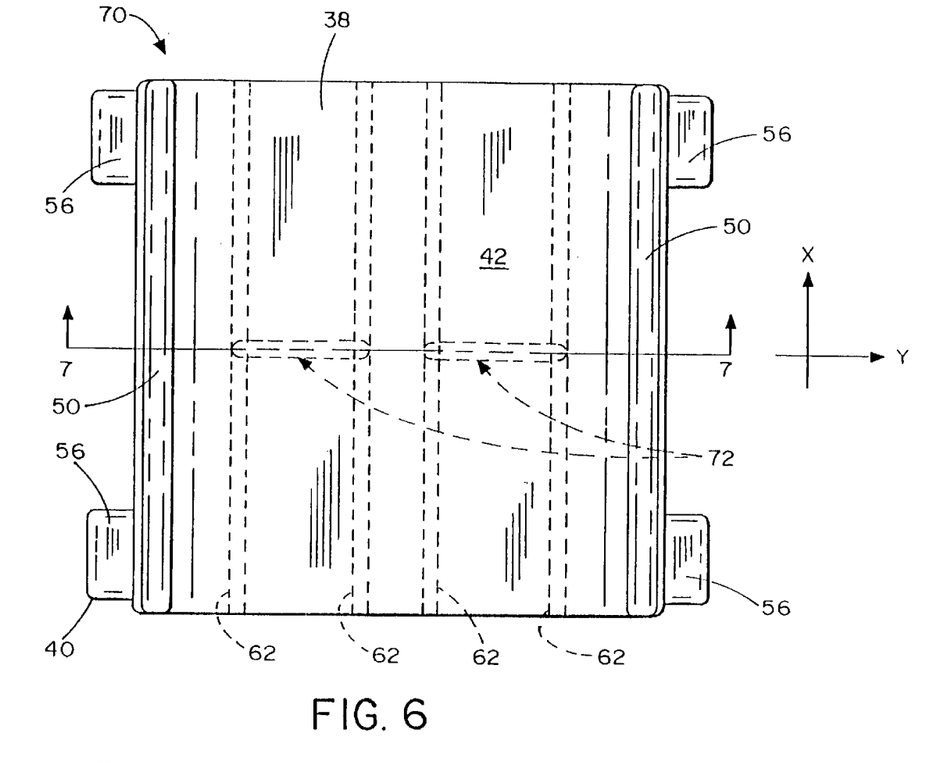
FIG. 6 is a top plan view of a second embodiment of a mount, similar to FIG. 3, with dashed lines indicating hidden laterally-extending vertical chambers.
Figure 7:
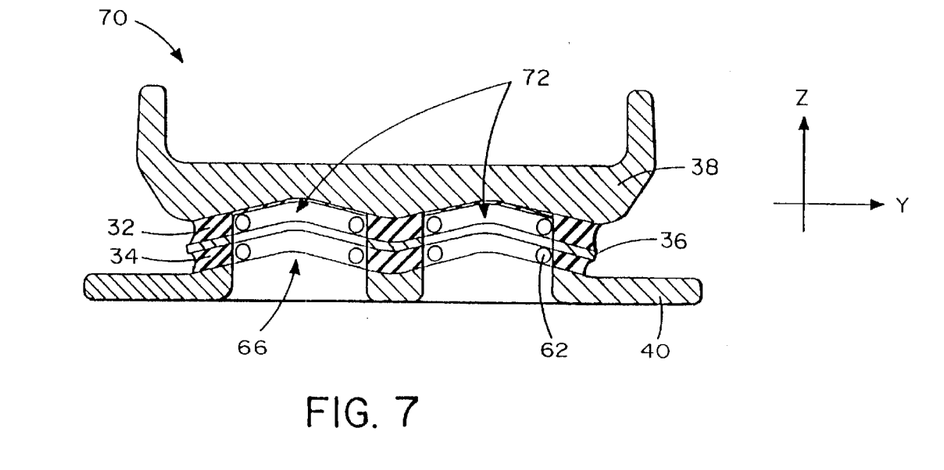
FIG. 7 is a cross-sectional view of the second embodiment of the mount taken along line 7—7 of FIG. 6.

Referring to FIGS. 6 and 7, a mount 70 similar to mount 10 of FIGS. 3 and 4 further includes cut-out portions forming chambers or cores 72 for increasing the bulge area of the mount. By further increasing the bulge area of the mount 70, the chambers 72 further reduce the compression-induced shear strain within the elastic layers 32 and 34. Also, the chambers 72 increase the ability to tune the spring rate ratios of the mount 70. Chambers 72 preferably are formed vertically through the bottom plate 40, the elastic material layers 32 and 34 and the rigid material layer 36, and extend to form and elliptical cut-out laterally through the mount 10. The chambers 72 are centered longitudinally within the mount 70 to distribute bulge equally at the longitudinal ends of the mount 70. Further, the chambers or cores 72 may additionally be formed at any angle, or they may be formed through the top plate 38, or they may be formed only within the elastic material layers 32 and 34. Therefore, the number, size, position and shape of the chambers 72 may vary, however, depending on the particular application.

Figure 8:
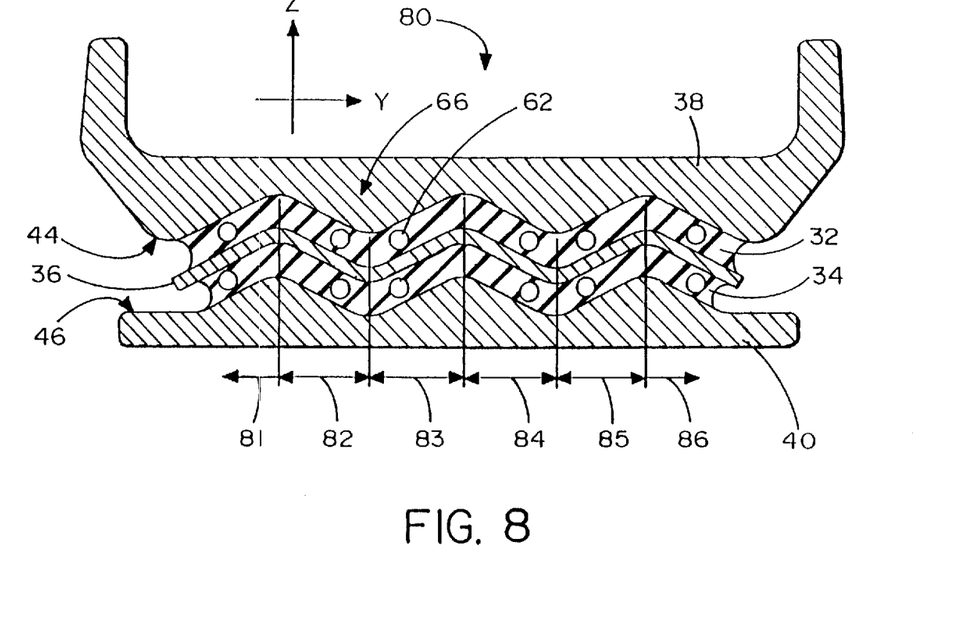
FIG. 8 is a cross-sectional view, similar to FIG. 7, of another embodiment of a mount.

Referring to FIG. 8, according to another embodiment, a mount 80 includes bottom surface 44, first and second layers 32 and 34, rigid layer 36 and top surface 46 with at least six sections 81–86, respectively, to provide an increased lateral spring rate Ky. In this embodiment, the lateral cross-section of the internal layers of the mount 80 take the form of an inverted WV-shape.

Figure 9:
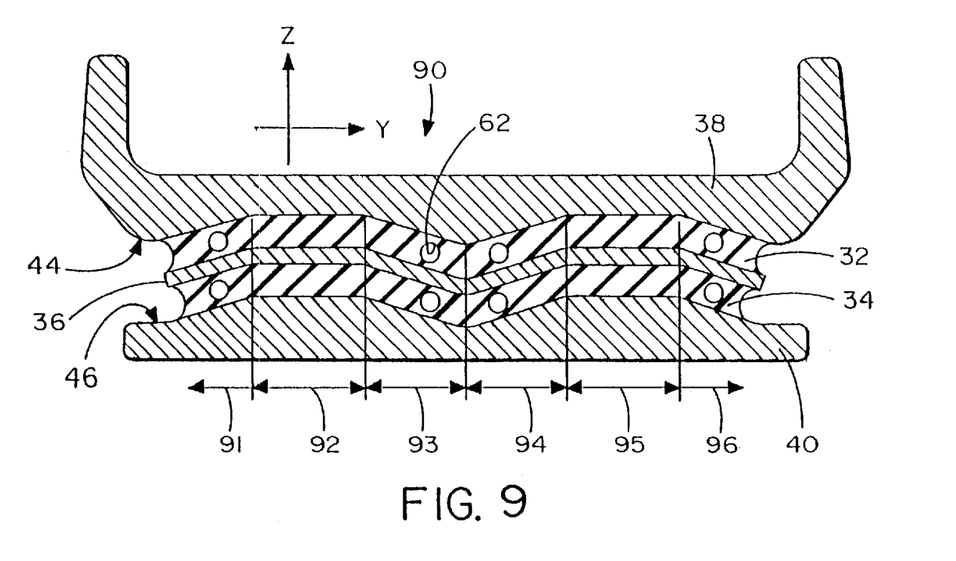
FIG. 9 is a cross-sectional view, similar to FIG. 7, of yet another embodiment of a mount.

Referring to FIG. 9, in yet another embodiment, a mount 90 includes bottom surface 44, first and second layers 32 and 34, rigid layer 36 and top surface 46 with at least six sections 91–96, including at least two substantially horizontal sections 92 and 95. The combination of the laterally-sloped sections 91, 93, 94, and 96 and horizontal sections 92 and 95 provides an enhanced ability to vary the spring rates of the mount 90.

Although the invention has been described and illustrated in detail, it is to be clearly understood that the same is intended by way of illustration and example only and is not to be taken by way of limitation. For example, the mount may not require a top and bottom plate, as it may be directly positioned between the side frame and bearing adapter. Also, the number and combination of elastic material and rigid material layers may vary, depending on the application. Further, as mentioned above, the angles and lateral lengths of the internal mount sections, the particular combination of angled sections, as well as the total number of sections may vary depending on the particular application. Additionally, the thickness of each elastic layer may vary. Accordingly, variations and modifications of the present invention will be apparent to one skilled in the art, and the following claims are intended to cover all such modifications and equivalents.

What is claimed is:

1. A mount in a railway truck for providing support between a frame and an axle, comprising:

a top plate having a first top surface for receiving loads and a first bottom surface, the first bottom surface having at least four sections each at an angle between a horizontal plane and a vertical plane, and at least two of the at least four sections being oriented in a different plane from the other two;

a bottom plate having a second bottom surface for carrying loads and a second top surface, the second top surface having at least four sections corresponding to and parallel with the at least four sections of the first bottom surface;

an intermediate plate spaced between the top plate and the bottom plate and defining a first space between the intermediate plate and the top plate and a second space between the intermediate plate and the bottom plate, the intermediate plate having at least four sections corresponding to and parallel with the at least four sections of the first bottom surface and the second top surface;

an elastic material in both the first space and the second space thereby forming first and second elastic material layers;

the arrangement of the first elastic material layer, the second elastic material layer and the rigid material layer being such that they abut against each other in cooperation to result in a lateral horizontal spring rate greater than a longitudinal horizontal spring rate; and a bulge area of the mount, defined as the vertical area in which the first elastic layer and the second elastic layer are free to horizontally expand, is greater than the combined perimeter vertical area of the first and second layers, defined as the vertical thickness of each layer multiplied by the perimeter length of each layer.

2. The mount of claim 1, each of the at least four sections of the first bottom surface, the rigid material layer and the second top surface, respectively, being continuous and arranged to form an inverted W-shape.

3. The mount of claim 1, each of the at least four sections of the first bottom surface, the rigid material layer and the second top surface, respectively, being continuous and arranged to form a W-shape.

4. The mount of claim 3, wherein a selected angular orientation of the at least four sections of the first bottom surface, the rigid material layer and the second bottom surface, in combination with a selected thickness of each of the first and second elastic material layers and the rigid material layer, form an arrangement to result in the lateral horizontal spring rate having a compression component and a shear component, and wherein the compression component is greater than the shear component.

5. The mount of claim 3, wherein the angular orientation of each of the at least four sections reverses from one section to the next section.

6. The mount of claim 5, wherein a transition area between adjacent ones of each of the at least four sections forms an arcuate portion of each of the respective sections.

7. The mount of claim 3, wherein at least one of the first and second elastic material layers includes a cut-out portion to define a horizontal, longitudinally-extending chamber.

8. The mount of claim 3, wherein at least one of the first and second elastic material layers includes a cut-out portion to define a vertically-extending chamber.

9. The mount of claim 3, wherein each of the first and second elastic material layers have a plurality of cut-out portions to define a plurality of horizontal, longitudinally-extending chambers, and wherein each of the first and second elastic material layers and the rigid material layer have corresponding cut-out portions to define a vertically-extending chamber.

10. The mount of claim 3, wherein each of the first bottom surface, the rigid material layer and the second top surface includes at least six sections, and wherein the at least six sections form a WV-shape.

11. The mount of claim 3, wherein each of the first bottom surface, the rigid material layer and the second top surface includes at least six sections, and wherein the at least six sections form an inverted WV-shape.

12. The mount of claim 3, wherein each of the first bottom surface, the rigid material layer and the second top surface includes at least six sections, and wherein two of the at least six sections are laterally angled parallel to the horizontal axis.

13. A suspension system for a railway truck, comprising:

a front axle and a rear axle, both axles having first and second axle ends mountable with wheels;

a first side frame and a second side frame, each side frame having a first frame end and a second frame end, the first frame ends connecting the first and second ends of the front axle and the second frame ends connecting the first and second ends of the rear axle; and a mount supporting each side frame at each axle, each mount comprising:

a first elastic material layer having a top surface connectable with a load-carrying portion of the frame;

a second elastic material layer having a bottom surface connectable with a load-receiving surface associated with the axle;

a rigid material layer positioned between the first elastic layer and the second elastic layer, the rigid layer including at least four sections, each one of the at least four sections being oriented in a plane at an angle between a horizontal plane and a vertical plane, and at least two of the at least four sections being oriented in a different plane from the other two;

the arrangement of the first elastic material layer, the second elastic material layer and the rigid material layer being such that they abut against each other in cooperation to result in a lateral horizontal spring rate greater than a longitudinal horizontal spring rate; and at least one of the first and second elastic material layers having a cut-out portion to define a chamber; and a bulge area of the mount, defined as the vertical area in which the first elastic layer and the second elastic layer are free to horizontally expand, is greater than the combined perimeter vertical area of the first and second layers, defined as the vertical thickness of each layer multiplied by the perimeter length of each layer.

14. The system of claim 13, each of the at least four sections of the first bottom surface, the rigid material layer and the second top surface, respectively, being continuous and arranged to form a W-shape.

15. The system of claim 13, each of the at least four sections of the first bottom surface, the rigid material layer and the second top surface, respectively, being continuous and arranged to form an inverted W-shape.

16. The system of claim 13, each of the at least four sections of the first bottom surface, the rigid material layer and the second top surface, respectively, reversing in angular orientation from one section to the next section.

17. The system of claim 13, the cut-out portion further defining a horizontal, longitudinally-extending chamber.

18. The system of claim 13, the cut-out portion further defining a vertically-extending chamber.

19. A mount in a railway truck for providing support between a frame and an axle, comprising:

a top plate having a first top surface for receiving loads and a first bottom surface, the first bottom surface having at least four sections each at an angle between a horizontal plane and a vertical plane, and at least two of the at least four sections being oriented in a different plane from the other two;

a bottom plate having a second bottom surface for carrying loads and a second top surface, the second top surface having at least four sections corresponding to and parallel with the at least four sections of the first bottom surface;

an intermediate plate spaced between the top plate and the bottom plate and defining a first space between the intermediate plate and the top plate and a second space between the intermediate plate and the bottom plate, the intermediate plate having at least four sections corresponding to and parallel with the at least four sections of the first bottom surface and the second top surface each of the at least four sections of the first bottom surface, the intermediate plate and the second top surface, respectively, being continuous and arranged to form a W-shape;

an elastic material in both the first space and the second space thereby forming first and second elastic material layers;

the arrangement of the first elastic material layer, the second elastic material layer and the rigid material layer being such that they abut against each other in cooperation to result in a lateral horizontal spring rate greater than a longitudinal horizontal spring rate; and a bulge area of the mount, defined as the vertical area in which the first elastic layer and the second elastic layer are free to horizontally expand, is greater than the combined perimeter vertical area of the first and second layers, defined as the vertical thickness of each layer multiplied by the perimeter length of each layer.

* * * * *